Patented June 21, 1938

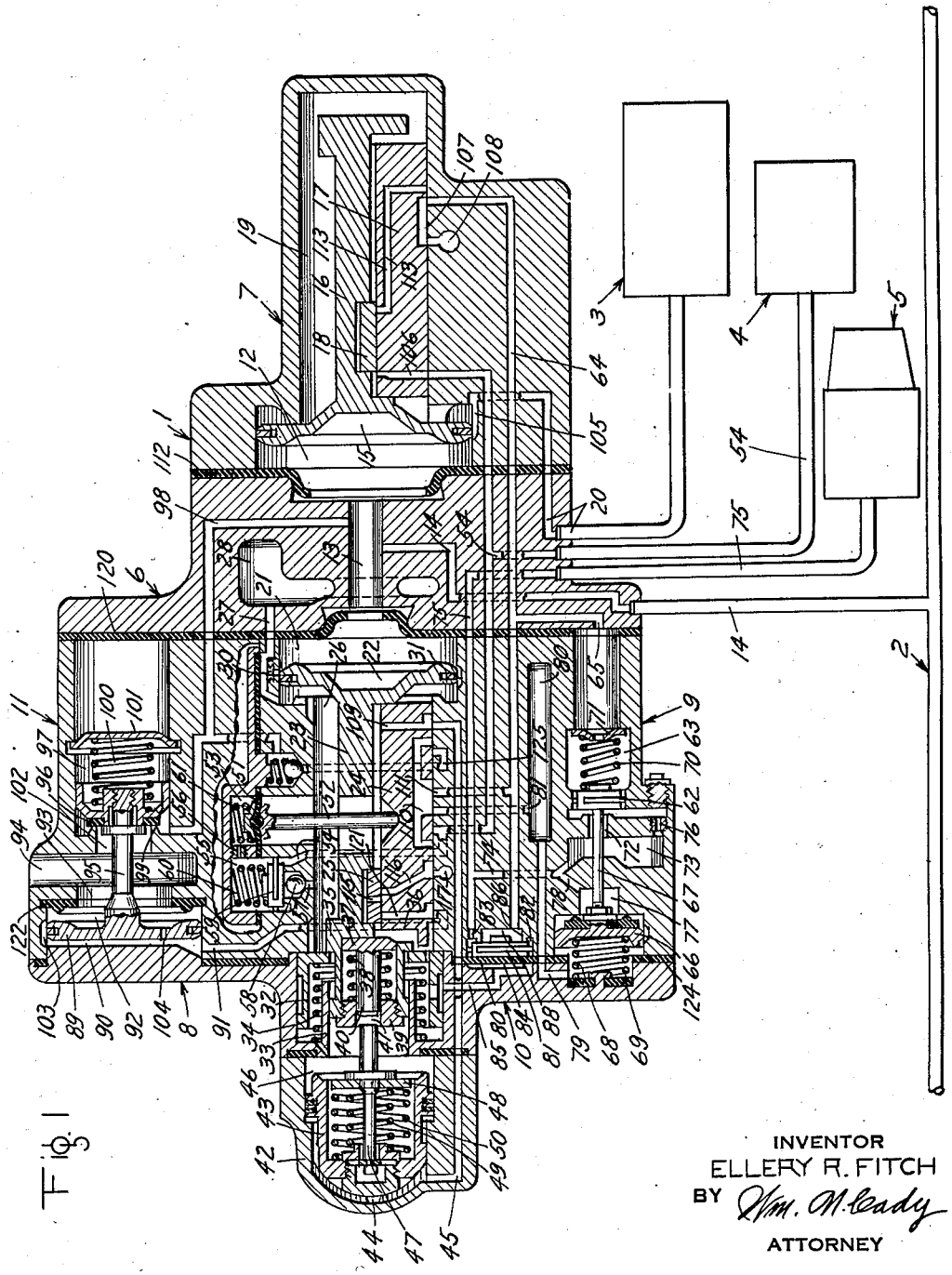

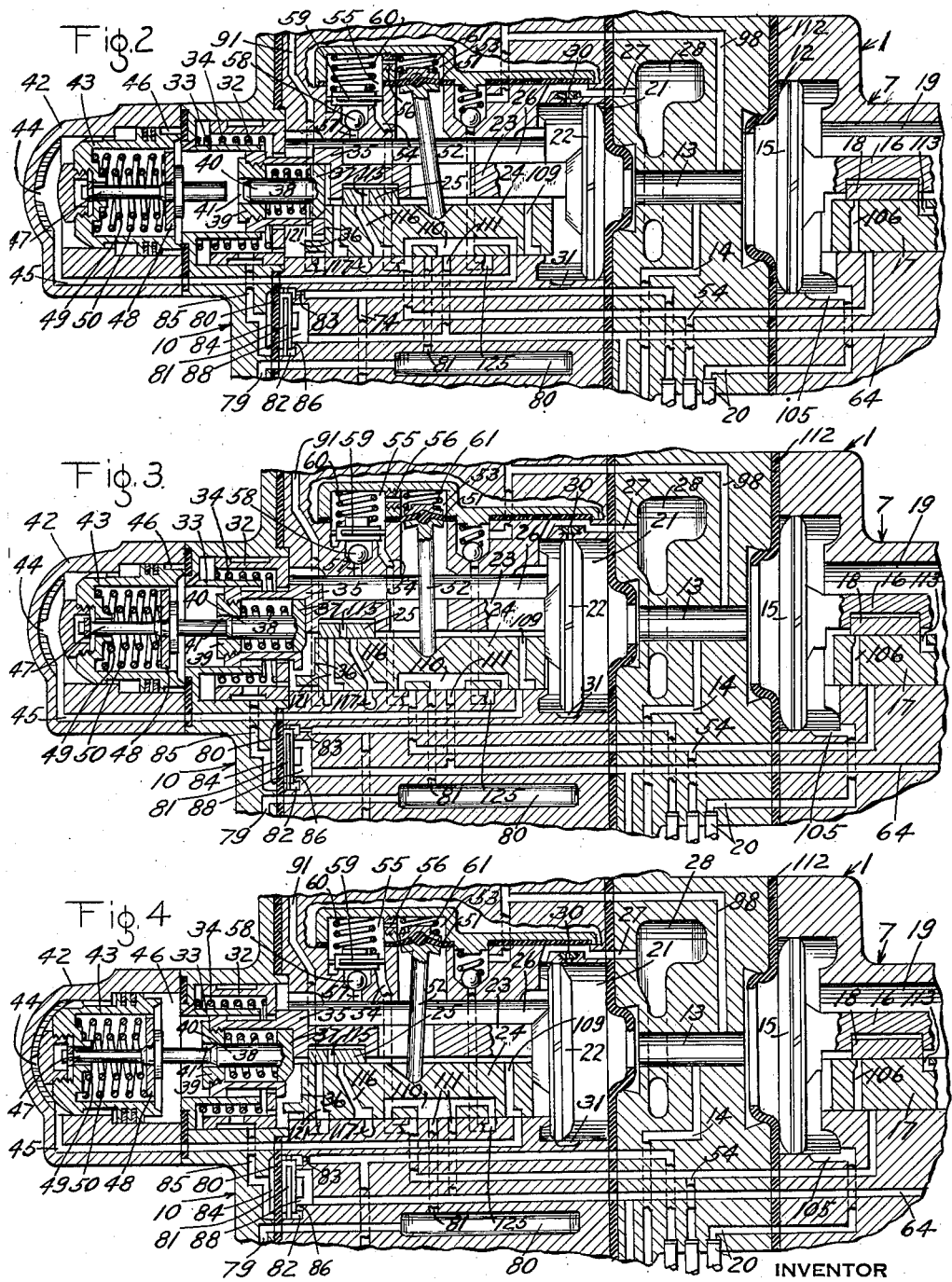

2,121,539

UNITED STATES PATENT OFFICE 2,121,539

FLUID PRESSURE BRAKE

Ellery R. Fitch, Irwin, Pa., assignor to The Westinghouse Air Brake Company, Wilmerding, Pa., a corporation of Pennsylvania Application March 13, 1937, Serial No. 130,727

12 Claims. (Cl. 303—64)

This invention relates to railway fluid pressure brake apparatus of the "AB" type and more particularly to the emergency portion thereof.

For the purpose of insuring the safe operation of railway trains it is the practice to, at intervals, inspect, clean and, when necessary, repair the several operating parts of the fluid pressure brake apparatus. With the K-type of apparatus this is done every eighteen months but with the "AB" type, due to the improvements incorporated therein, the interval between inspections has been increased from eighteen months to thirty six months.

It is possible that in some cases after such a long period of service the small charging communication between the emergency piston chamber and the quick action chamber may become clogged to such an extent with foreign matter such as dirt and oil as to prevent the proper recharge of the quick action chamber, and since in effecting an emergency application of the brakes the timing valve device is controlled according to quick action chamber pressure, it will be seen that during an emergency application of the brakes following a release after a heavy service application the reduced quick action chamber pressure will not be great enough to hold the timing valve closed for the period of time required to insure the gentle run in or closing of the slack in the trains. This results in a more rapid build up in brake cylinder pressure than is intended and is very objectionable in that such a rapid local build up is liable to cause heavy slack run in or closing shocks.

If this small charging communication between the emergency piston chamber and the quick action chamber becomes completely clogged, then when the brakes are being released following an emergency application, the several parts of the emergency portion will be moved to back dump position, and since the quick action chamber is at atmospheric pressure following an emergency application, the emergency portion will remain in this position until the next emergency application of the brakes is effected and thereafter will only move to the normal release position under the influence of the usual return spring which acts on emergency piston stem. This is objectionable in that an intended emergency application of the brakes cannot be effected on the car on which the clogged communication is located.

The principal object of the invention is to provide the emergency portion of a fluid pressure brake controlling valve device of the type having a charging communication of small flow area around the emergency piston with means whereby the possibility of clogging such communication over a comparatively long period of time is minimized without seriously interfering with the normal operation of the valve device.

This object is attained by the provision of a small feed groove or passage around the emergency piston which is in addition to the usual choked feed communication, so that with the emergency piston in normal release position, fluid under pressure will be supplied by way of both the usual communication and the additional communication. Obviously in this construction less air will pass through the choked feed communication between inspection periods than heretofore. It therefore follows that under usual service conditions there will be less dirt and oil collect in the choked feed communication than heretofore and as a consequence the danger of clogging the communication between inspection periods is reduced to a minimum.

Other objects and advantages will appear in the following more detailed description of the invention.

In the accompanying drawings, Fig. 1 is a diagrammatic sectional view of a fluid pressure brake equipment embodying the invention; the several parts of the equipment being shown in their normal release positions; Fig. 2 is a fragmentary diagrammatic sectional view of the equipment showing the several parts thereof in emergency application position; and Figs. 3 and 4 are fragmentary diagrammatic sectional views similar to Fig. 2 but showing the several parts of the equipment in their normal release and inner release positions, respectively.

As shown, the equipment may comprise a brake controlling valve mechanism 1, a brake pipe 2, an auxiliary reservoir 3, an emergency reservoir 4 and a brake cylinder 5.

The brake controlling valve mechanism shown may be of the "AB" type but the showing in the drawings has been simplified by omitting several ports, passages and parts which are not necessary to a clear understanding of the invention. This mechanism may comprise a pipe bracket 6 to one side of which is clamped the casing of a triple valve device 7 and to the opposite side of which is clamped the casing of an emergency valve device 8, the latter casing housing a brake cylinder build up control valve mechanism 9, a timing valve mechanism 10 and a quick action vent valve mechanism 11.

The triple valve casing has formed therein a piston chamber 12 which is connected to the brake pipe 2 by way of a passage 13 and a passage and pipe 14 and which contains a piston 15 having a stem 16 adapted to operate a main slide valve 17 and an auxiliary slide valve 18 contained in a valve chamber 19 which is connected through a passage and pipe 20 to the auxiliary reservoir 3.

The casing of the emergency valve device 8 has formed therein an emergency piston chamber 21 which is connected to the passage 13 and consequently to the brake pipe 2 and which contains an emergency piston 22 having a stem 23 adapted to operate a main slide valve 24 and an auxiliary slide valve 25 contained in a valve chamber 26 which is connected through a passage 27 with a quick action reservoir 28 formed in the pipe bracket 6.

The emergency piston chamber 21 is normally in communication with the passage 27 and consequently with the emergency valve chamber 26 and quick action chamber 28 by way of a passage, in which there is interposed choke plug 30 and, according to the invention, is also in direct communication through a feed groove 31 with the chamber 26, which, as shown in Fig. 4 and, as will hereinafter appear, is adapted to be closed by the piston in its traverse to its inner release position. The flow area of the passage in the choke plug 30 will be the same as now employed and that of the feed groove 31 will be such that when either a reduction or an increase in brake pipe pressure is effected, the rate of decrease or increase in the pressure of chamber 26, due to the flow of fluid through the feed groove, will not materially interfere with the normal operations of the emergency valve device.

The rear end portion of the emergency piston stem 23 extends through a central opening in a movable stop member 32 and is slidably guided by an annular guide 33 which is carried by the casing. The stop member 32 is slidably guided by the casing and is subject to the pressure of the spring 34 which, as shown in Fig. 1, acts to normally urge the stop forwardly into contact with an annular shoulder formed by the casing.

The piston stem 23, at a point located a short distance inwardly from its rear end, is provided with an operating shoulder or collar 35 one side of which is adapted to engage the forward end of the stop member 32 and the other side of which is adapted to engage a rear end surface 36 of the main slide valve 24.

Slidably mounted in the rear end portion of the emergency piston and stem 23 is a plunger 37 which is subject to the action of a spring 38 interposed between and engaging the plunger and a plug 39 having screw threaded connection with the stem 23. The plunger is provided with a rearwardly extending stem 40 which is slidably guided within a central bore 41 provided in the plug.

Associated with the emergency valve device and more particularly with the actuating piston stem thereof, is a mechanism which, when an emergency application of the brakes is effected, will oppose movement of the emergency valve parts toward release position until a predetermined brake pipe pressure is attained and will then be rendered ineffective to oppose such movement. From this it will be apparent that the mechanism will prevent accidental movement of the emergency valve parts toward release position when an emergency application of the brakes is being effected and will insure movement of the emergency valve parts to their inner release or back dump position when the brake pipe pressure has been increased a predetermined amount in releasing the brakes following an emergency application.

This back dump insuring mechanism may be identical with the corresponding device fully described in U. S. Letters Patent No. 2,045,185, issued June 23, 1936 to Ellis E. Hewitt. Since the details and operating characteristics of the mechanism have been fully described in this patent it may be briefly described here as comprising a casing 42 in which is slidably mounted a piston 43 having at one side a chamber 44 which is connected to a passage 45 leading to the seat of the emergency main slide valve 24, and having at the other side a chamber 46 which is in constant open communication with the slide valve chamber 26. Carried by the piston 43 is a plunger 47 which is movable longitudinally a limited distance relative to the piston and which at its outer end is adapted to engage the end of the plunger 40 carried by the emergency piston stem 23 or if desired by the end of the stem itself. Secured to the plunger 47 against movement relative thereto is a spring seat 48, and interposed between and engaging the spring seat 48 and the piston 43 are springs 49 and 50 which act through the medium of the spring seat 48 and plunger 47 to yieldably oppose longitudinal movement of the plunger relative to the piston 43.

For the purpose of preventing fluid under pressure, acting on the under side of the main slide valve 24 of the emergency valve device from raising the valve from its seat when the pressure of fluid in the emergency valve chamber 26 is reduced, a loading mechanism is provided. This mechanism may comprise a flexible diaphragm 51 which is mounted in the emergency valve casing and operatively engages a rocking pin 52 through which a loading force is adapted to be transmitted from the diaphragm to the main slide valve. The under side of the diaphragm is exposed to the chamber 26 and the other side to a chamber 53 to which the emergency reservoir 4 is constantly connected by way of a pipe and passage 54, a check valve chamber 55 and a choke plug 56. The emergency slide valve chamber 26 is adapted to be connected to the chamber 55 and consequently to the emergency reservoir passage 54 by way of a passage 57 and past check valves 58 and 59 which are arranged in series and contained in chamber 55, the check valve 59 being subject to the pressure of a spring 60 also contained in the chamber 55. It will thus be seen that the diaphragm 51 is normally subject on one side to emergency reservoir pressure and on the opposite side to a corresponding fluid pressure in slide valve chamber 26. Since these opposing pressures are thus balanced, the diaphragm cannot act to exert downward pressure on the main slide valve when the brakes are released and the equipment is charged to the pressure normally carried. Contained in the diaphragm chamber 53 and interposed between and engaging the emergency valve casing and a spring seat member which is in operative engagement with the diaphragm 51, is a light coil spring 61 which acts through the medium of the diaphragm and rocking pin 52 to hold the main slide valve 48 to its seat when the valve device is being assembled or shipped, and is not relied upon to hold the slide valve to its seat against the action of fluid under pressure on the under side of the valve, although it does assist in so doing.

Also associated with the emergency valve device is the inshot valve mechanism 9 which is operative when effecting an emergency application of the brakes to provide an initial inshot of fluid to the brake cylinder until a predetermined brake cylinder pressure (about fifteen pounds) is developed and to then restrict the rate of flow of fluid to the brake cylinder, said mechanism comprising a valve 62 contained in a chamber 63 which is constantly open through a branch passage 65 to the passage 64 and also comprises a valve piston 66 having a stem 67 secured thereto, through the medium of which stem the operation of the valve 62 is controlled. Normally, the valve piston 66 is maintained in sealing engagement with the casing by the action of a coil spring 68 contained in a chamber 69 at one side of the valve piston 66, and when in this position, the stem 67 maintains the valve 62 unseated against the action of a spring 70 tending to seat the valve. The spring 70 is interposed between and engages the valve 62 and a spring seat 71 seated on an annular shoulder formed on the casing within the valve chamber 63.

With the valve 62 unseated, the valve chamber 63 is open to the brake cylinder 5 by way of a passage 72, a chamber 73, a passage 74 and a passage and pipe 75, and is also open to the chamber 73 through a choke plug 76 which has screw threaded connection with the casing. The inner seated area of the valve piston 66 is exposed to a chamber 77 which is connected through a passage 78 to the passage 74. The chamber 69 at the opposite side of the valve piston is open through a passage 79 to a small chamber 80 which is connected to a passage 81 leading to the seat of the emergency main slide valve 24.

The timing valve device 10 is also contained in the casing of the emergency valve device and operates in effecting an emergency application of the brakes to supply a final inshot of fluid under pressure to the brake cylinder at a predetermined time after the inshot valve mechanism 9 operates to retard the flow of fluid to the brake cylinder. This device comprises a flexible diaphragm 80, which is adapted to control the operation of a valve 81 contained in a chamber 82 at one side of the diaphragm and connected to the brake cylinders through a restriction 83 and passage and pipe 75. At the other side of the diaphragm there is a chamber 84 which is connected to the emergency valve chamber 26 and consequently to the quick action chamber 28 by way of a passage 85. The diaphragm is normally subject to the pressure of fluid supplied from the quick action chamber 28 and slide valve chamber 26 to the diaphragm chamber 84 for holding the timing valve 81 seated on an annular seat rib 86. The inner seated area of the valve is exposed to a chamber 88 which is connected to the passage 64.

The quick action mechanism 11 is associated with the emergency valve device and is mounted in the emergency valve casing. This device 11 may comprise a quick action piston 89, at one side of which is a piston chamber 90 to which fluid under pressure is adapted to be supplied by way of passage 91 when an emergency application of the brakes is initiated. At the other side of the piston there is a chamber 92 which is open to the atmosphere through an opening 93 and a passage 94 in the casing. The piston 89 is operatively connected by a stem 95 to a brake vent valve 96 contained in a chamber 97 to which the brake pipe is connected by way of passage 13 and a passage 98. The valve 96 is normally maintained seated on a seat rib 99 by the action of a coil spring 100 interposed between and engaging the valve and a spring seat 101 carried by the casing, thus the valve closes off communication through a passage 102 leading from the chamber 97 to the atmospheric passage 94. With the quick action piston in its normal position as shown in Fig. 1, the piston chamber 90 is open to the atmosphere by way of a leakage groove 103 around the piston and also by way of a small port 104 to the piston. The purpose of this small port 104 is to control the rate of flow of fluid from the emergency valve chamber and connect quick action chamber 28 to the atmosphere so as to insure the vent valve remaining open until fluid under pressure is substantially completely vented from the brake pipe. The leakage groove 103 provides for a fairly rapid discharge of fluid from the piston chamber 90, so that in the event of the leakage of fluid into the chamber by way of the passage 91, the development of sufficient pressure in said chamber to cause said piston to unintentionally flow to its valve unseating position is prevented.

*Initial charging*

In initially charging the equipment, fluid under pressure is applied to the brake pipe 2 in the usual manner. Fluid thus supplied to the brake pipe flows therefrom through pipe and passage 14 and passage 13 to both the triple valve piston chamber 12 and emergency piston chamber 21.

With the triple valve parts in release position as shown in Fig. 1 fluid under pressure flows from the piston chamber 12 through a feed groove 105 to the triple valve slide valve chamber 19 and from thence flows through passage and pipe 20 to the auxiliary reservoir 3. Also from the valve chamber 19 fluid under pressure flows to the emergency reservoir by way of a restricted port 106 in the main slide valve 17 of the triple valve device and passage and pipe 54.

Further with the triple valve parts in release position the brake cylinder is connected to the atmosphere through pipe and passage 75, passage 74, chamber 73, passage 72, past the unseated valve 62 of the inshot valve mechanism, valve chamber 63, passage 65, passage 64, a cavity 107 in the main slide valve 17 of the triple valve device and passage 108.

With the emergency valve parts in release position as shown in Fig. 1, fluid under pressure flows from the emergency piston chamber to both the emergency slide valve chamber 26 and quick action chamber 28 by way of both the choke plug 30 and feed groove 31, and from the valve chamber 26 fluid under pressure flows through a port 109 in the emergency main slide valve 24 and passage 45 to the chamber 44 at one side of the piston 43. Since the chamber 46 at the opposite side of the piston 43 is also in communication with the emergency slide valve chamber 26 the fluid pressures on opposite sides of the piston are balanced and the piston will be inactive.

From the valve chamber 26 fluid under pressure flows through passage 85 to the chamber 84 at one side of the flexible diaphragm 80 and causes the diaphragm to act to seat the timing valve 81.

Further, with the emergency valve parts in release position, the chamber 69 at one side of the valve piston 66 of the inshot valve mechanism is connected to the atmosphere by way of passage 79, reservoir 80, passage 81, a cavity 110 in the emergency main slide valve 24, a passage 111, passage 64, cavity 107 in the main slide valve 17 of the timing valve device and passage 108.

Service application of the brakes

A service application of the brakes is initiated by effecting a gradual reduction in brake pipe pressure in the usual manner. Since, as before described, the brake pipe 2 is in communication with the triple valve piston chamber 12 and with the emergency piston chamber 21, the pressure of fluid in these chambers gradually reduces with the brake pipe pressure. Upon the reduction in the pressure of fluid in the triple valve piston chamber 12, the pressure of fluid in the triple valve slide valve chamber 19 causes the triple valve piston 15 to move outwardly into sealing engagement with a gasket 112 which is interposed between the triple valve casing and the pipe bracket 6. The piston in its initial movement closes the feed groove 105 and shifts the auxiliary slide valve 18 relative to the main slide valve 17 to first lap the port 106 and then uncover the service port 113 in the main slide valve 17, after which, both slide valves are moved in unison to their brake application position in which the service port 113 registers with the passage 64.

Fluid under pressure now flows from the triple valve slide valve chamber 19 and connected auxiliary reservoir 3 to the brake cylinder 5 by way of service port 113, passages 64 and 65, valve chamber 63 of the inshot valve mechanism, past the unseated valve 62, through passage 72, chamber 73, passage 74 and passage and pipe 75. From the passage 64 fluid under pressure flows through passage 111, cavity 110 and in the emergency main slide valve 24, passage 81, chamber 80 and passage 79 to the chamber 69 on the inshot valve mechanism and since fluid under pressure in chamber 69 acts over a greater area of the piston than does the fluid under pressure in chamber 77 the valve piston 66 will be maintained seated as shown in Fig. 1 and as a consequence the valve 62 will be maintained unseated by the stem 67.

Upon a service reduction in the pressure of fluid in the emergency piston chamber 21, the emergency piston 22 and auxiliary slide valve 25 are shifted outwardly, i. e., in the direction toward the right hand, relative to the main slide valve 24, by fluid in the emergency valve chamber 26 and connected quick action chamber 28. The piston as it is thus shifted cuts off the communication between the emergency piston chamber 21 and the valve chamber 26 by way of the choke plug 30 and feed groove 31, and at substantially the same time, a port 115 in the auxiliary slide valve 25 is brought into registration with a port 116 in the main slide valve 24, which latter port is connected through a passage 117 to the atmosphere. Fluid under pressure now flows through these registering ports and passage from the emergency valve chamber 26 and connected quick action chamber 28 at a rate substantially equal to the service rate of reduction in the pressure of fluid in the emergency piston chamber 21, so that the operating pressure differential on the piston 22 is substantially destroyed, and as a result the piston and consequently the auxiliary slide valve 25 comes to a stop. In the service position of the emergency piston, the plunger 40, carried by the piston stem 23, is adapted to just engage the rear end surface 36 of the main slide valve 24, so that unintentional further movement of the piston and auxiliary slide valve toward the right hand is prevented by the pressure of the spring 38. When the pressure of fluid in valve chamber 26 is reduced, fluid at emergency reservoir pressure present in the diaphragm chamber 53 exerts an inwardly directed force on the diaphragm 51 which is transmitted through the rocking pin 52 to the main slide valve 24 and which so loads the main slide valve as to eliminate the danger of the slide valve being raised from its seat by fluid under pressure being supplied through the cavity 110 to the small reservoir 80.

When the desired amount of brake pipe reduction has been made and auxiliary reservoir pressure is reduced slightly below brake pipe pressure, the triple valve piston 15 and the graduating valve 18 move to the right until they are brought to a stop by the engagement of the piston stem 16 with the forward end of the main slide valve 17. The graduating valve in this position laps the service port 113 in the main slide valve and thereby cuts off further flow of auxiliary reservoir air to the brake cylinder.

The emergency piston 22 and graduating valve 25 return to their normal or charging positions when the pressure of fluid in the valve chamber 26 is reduced slightly below brake pipe pressure in piston chamber 21. In this position a graduating valve 25 laps the port 116 in the main slide valve 24, thereby preventing further flow of fluid from the valve chamber 26 and connected quick action chamber 28 to the atmosphere.

Release of the brakes following a service application

To effect a release of the brakes following a service application, fluid under pressure is supplied to the brake pipe 2 and flows therefrom to the triple valve piston chamber 12 and emergency piston chamber 21 in the same manner as has before been described in connection with the initial charging of the equipment.

The increase in the pressure of fluid in the triple valve piston chamber 12 causes the triple valve piston 15 and associated slide valves 17 and 18 to move to their release position in which fluid under pressure is released from the brake cylinder 5 by way of pipe and passage 75, passage 74, chamber 73 in the inshot valve mechanism, passage 72, past the valve 62, through valve chamber 63, passage 65, passage 64, cavity 107 in the main slide valve 17, and passage 108.

Further with the triple valve parts in release position fluid under pressure flows from the piston chamber 12 through feed groove 105 to valve chamber 19 and connected auxiliary reservoir 3, and fluid under pressure from the fully charged emergency reservoir 4 flows through pipe and passaage 54 and port 106 in the main slide valve to the chamber 19 and connected auxiliary reservoir, the port 106 being restricted to retard the rate of build up of auxiliary reservoir pressure.

From the emergency piston chamber 21 fluid under pressure flows through the choke plug 30 and feed groove 31 to the slide valve chamber 26 and connected quick action chamber 28.

Emergency application of the brakes

To effect an emergency application of the brakes, fluid under pressure is suddenly vented from the brake pipe 2 and from the connected triple valve piston chamber 12 and emergency valve piston chamber 21 and upon said reduction the triple valve device operates in the same manner as in effecting a service application of the brakes to supply fluid under pressure from the auxiliary reservoir 3 to the brake cylinder 5.

At substantially the same time as the triple valve device operates, fluid in the emergency valve chamber 26, acting on the inner face of the emergency piston 22 causes the piston to move and first shift the auxiliary slide valve 25 relative to the main slide valve 24 and then shift both slide valves in unison to emergency position, in which position the piston engages a gasket 120 clamped between the casing of the emergency valve device and the pipe bracket 6. The piston 22, as it is thus moved, closes communication through the choke plug 30 and feed groove 31 from the piston chamber 21 to the valve chamber 26 and quick action chamber 28, after which the auxiliary slide valve 25 uncovers a port 121 in the main slide valve 24, which port, at the seat of the main slide valve is in communication with the passage 91, so that fluid under pressure now flows through the port and passage from the emergency valve chamber 26 and connected quick action chamber 28 to the quick action piston chamber 90.

After the port 121 has been uncovered, the collar 35 on the emergency piston stem 23 engages the rear end of surface 36 of the main slide valve 24, so that the piston as it continues to move, shifts the main slide valve to emergency position. At the time the collar 35 engages the main slide valve, the spring 38 will have been compressed, the compression of the spring being started just prior to the auxiliary slide valve 25 opening the port 121.

Now as the main slide valve is moved toward emergency position, the end of the valve moves beyond the passage 91, so that fluid flows directly from the valve chamber 26 to the passage.

The pressure of fluid thus supplied to the quick action piston chamber 90 causes the quick action piston 89 to move inwardly against the opposing pressure of the spring 100, into sealing engagement with the annular seat rib of a gasket 122 mounted in the casing, in which position the piston will have closed the leakage groove 103. The piston 89 as it is thus moved, shifts the vent valve 96 out of sealing engagement with the seat rib 99, thereby opening the brake pipe passage 98 to the atmosphere by way of passages 102 and 94.

With the quick action piston in sealing engagement with the gasket 122, fluid under pressure is gradually vented from the emergency slide valve chamber 26 and quick action chamber 28 to the atmosphere by way of the small port 104 in the quick action piston. When the quick action chamber pressure has been reduced to a predetermined degree by the flow of fluid through this small port, the spring 100 acts to close the quick action valve 96 and also acts through the medium of the stem 95 to return the piston 89 to its extreme outer position in which it is shown in Fig. 1 of the drawings. The rate at which the quick action chamber pressure reduces through the port 104 is slow enough to insure the quick action valve 96 remaining open until substantially the complete venting of fluid under pressure from the brake pipe has been accomplished. With the emergency main slide valve 24 in emergency position, the cavity 110 connects the emergency reservoir passage 54 to the passage 111 so that fluid under pressure now flows from the emergency reservoir 4 to the passage 64 through which fluid under pressure is being supplied from the auxiliary reservoir by the triple valve device.

Fluid under pressure thus supplied from the auxiliary reservoir 3 and emergency reservoir 4 to the passage 64 flows through passage 65 to the valve chamber 63 of the inshot valve mechanism and from thence flows past the unseated valve 62, and in parallel through the choke plug 76 to the brake cylinders by way of chamber 73, passage 74 and passage and pipe 75. From the passage 64 fluid under pressure flows to the chamber 88 to which the inner seated area of the timing valve is exposed. It will here be noted that the passage 81 leading from the seat of the main slide valve 24 to the small reservoir 80 is lapped by said valve in emergency position, and since the passage 81 had been open to the atmosphere by way of the cavity 110 and vented passages 111 and 64 in the release position of the emergency valve device and triple valve device, the reservoir 80 and connected inshot valve piston chamber 69 are at substantially atmospheric pressure when an emergency application of the brakes is initiated in the manner just described. As a result, the inshot valve piston 66 is held in the position in which it is shown in Fig. 1 by the force of the spring 68.

Fluid under pressure supplied to the passage 74 flows through passage 78 to the chamber 77 of the inshot valve mechanism. Now when the pressure of fluid being supplied to the brake cylinder 5 through passage 74 and acting on the inner seated area of the inshot valve piston 66, becomes great enough to overcome the opposing force of the spring 68, said valve piston moves outwardly into sealing engagement with a gasket 124 carried by the casing, permitting the spring 70 to seat the valve 62 and thereby cut off the flow of fluid from chamber 63 to the passage 72. With the valve 62 thus seated, fluid under pressure continues to flow from the inshot valve chamber 63 to the brake cylinder by way of the choke plug 76, chamber 73, passage 74 and passage and pipe 75, the choke plug 76 forming a by-pass communication around the valve 62.

The pressure of fluid in chamber 88 and passage 64 acts on the inner seated area of the timing valve 81 and the portion of the diaphragm and valve exposed to the chamber 82 is subjected to the pressure of fluid supplied through the restriction 83 in the passage 75, so that one side of the flexible diaphragm is subjected to fluid at brake cylinder pressure and the pressure of fluid in chamber 82 and the other side of the diaphragm is subjected to the reducing quick action chamber pressure in the emergency valve chamber 26. When the increasing pressure on the first mentioned side of the diaphragm becomes sufficient to overcome the pressure of fluid in chamber 84 and acting on the other side of the diaphragm, said diaphragm is flexed outwardly, permitting fluid under pressure acting on the inner seated area of the valve to move the valve out of engagement with the seat rib 86. The pressure of fluid acting on the inner seated area of the valve is greater than the fluid pressure in diaphragm chamber 82 due to the restriction offered to the flow of fluid to the chamber by the choke 83, so that upon breaking the seal between the valve and the seat rib 86, the entire surface of the flexing portion of the diaphragm is subjected to the higher pressure from passage 64, which results in the diaphragm being quickly flexed outwardly permitting fluid under pressure from passage 164 to unseat the valve with a snap like action. With the valve unseated, fluid under pressure now flows from the passage 64, past the unseated valve 81 and through the restriction 83 and passage and pipe 75 to the brake cylinder. Since fluid under pressure continues to flow through the choke plug 76 in the inshot valve device to the brake cylinder, this third stage of increase in brake cylinder pressure will be at a fairly fast rate. The brake cylinder pressure continues to build up at this fast rate to equalization with the pressure in said reservoir.

Further, with the emergency main slide valve 24 in emergency position, the cavity 110 is in communication with the passage 45, so that fluid under pressure is supplied from the cavity to the piston chamber 44 of the device 42. Fluid under pressure thus supplied to the piston chamber 44 causes the piston 43 to move outwardly, i. e., in a direction toward the right hand into its retarding relationship with the rear end of the emergency piston stem 23.

*Release of the brakes following an emergency application*

To effect a release of the brakes after an emergency application, fluid under pressure is supplied to the brake pipe 2 and flows to the triple valve piston chamber 12 and to the emergency piston chamber 21. Fluid in the slide valve chamber 19 of the triple valve device is at reduced auxiliary reservoir pressure and fluid in the slide valve chamber 26 of the emergency valve device is at atmospheric pressure so that if it were not for the back-dump insuring device 42 a slight increase in brake pipe pressure when an emergency application of the brakes is being effected would cause the emergency piston and associated slide valves to unintentionally move to either an inner or outer release position. However, when this valve device 42 is used it prevents the emergency valve parts from moving to a release position until the brake pipe pressure has been increased to approximately twenty pounds. When this pressure has been obtained in the brake pipe and consequently in the emergency piston chamber 21 the emergency piston and associated slide valves move inwardly against the opposing pressure of the coil springs 48 and 49 of the back-dump insuring device 42 as transmitted to the emergency piston stem 23 through the medium of the inter-contacting plungers 40 and 47 of the piston stem 23 and piston 43, respectively. As the piston and slide valves are thus being moved and before the piston uncovers feed groove 31 and the port leading to the choke plug 30, the port 109 in the main slide valve 24 is connected to the passage 45 as shown in Fig. 3, so that fluid under pressure is vented from the piston chamber 44 to the emergency valve chamber 26 which latter chamber is at substantially atmospheric pressure. With the piston chamber 44 thus vented, the release insuring device 42 will no longer resist movement of the emergency piston and associated slide valve toward release position and as a consequence fluid under pressure in piston chamber 21 causes these parts as well as the device 42 to move from the position in which they are shown in Fig. 3 to inner release position as shown in Fig. 4, the piston in its traverse to the position in which it is shown in Fig. 3 uncovering the feed groove 31 and passage leading to the choke plug 30 and then cutting off the communication through the feed groove 31 as the piston nears its innermost position. With the main slide valve 24 in the inner release position, the cavity 110 in said valve connects the passage 111 which is in communication with the brake cylinder to a passage 125 leading to the passage 98 which is in communication with the brake pipe, so that fluid under pressure flows from the brake cylinder and auxiliary reservoir to the brake pipe, thus very materially assisting in charging the brake pipe. Interposed in this passage is a spring weighted ball check valve 136 which prevents back flow of fluid from the brake pipe through the passage.

When the pressure of fluid in the triple valve chamber 12 has been increased silghtly above that of the fluid in slide valve chamber 19 and auxiliary reservoir 3, the triple valve piston and thereby the slide valves 18 and 19 are shifted to release position in which the exhaust cavity 107 in the main slide valve 17 connects the passage 64 to the exhaust passage 108, so that fluid under pressure is vented from the brake cylinders and as a consequence the brakes are released.

With the triple valve piston in release position, fluid under pressure flows through the feed groove 105 to the valve chamber 19 and auxiliary reservoir 3 and with the slide valves 17 and 18 in release position the port 106 establishes communication between the valve chamber 19 and the passage 54 connected to the emergency reservoir 4 so that the emergency reservoir will be charged with fluid from the chamber 19.

With the emergency piston 21 in its inner release position as shown in Fig. 4, fluid under pressure flows from the piston chamber 21 only by way of choke plug 30 through the valve chamber 26 and quick action chamber 28, the piston as it passes through its outer release position having cut off communication through the feed groove 31. Now when the pressure of fluid in the valve chamber 26 has been increased to substantially the pressure of fluid in the emergency piston chamber 21 the spring controlled stop 32 which is in engagement with the main slide valve 24 acts to move the emergency valve parts to their normal release position as shown in Figs. 1 and 3 in which position the piston chamber and valve chamber are connected together through the choke plug 30 and feed groove 31. With the emergency valve parts in their outer release position any further charging of the valve chamber 26 and quick action chamber 28 is by way of both the choke plug 30 and feed groove 31.

*General considerations*

It will be noted that in initially charging the equipment or in recharging the equipment to effect a release of the brakes, fluid under pressure flows from the emergency piston chamber 21 to the emergency valve chamber 26 by way of both the choke plug 30 and the feed groove 31. Obviously, the amount of fluid which will pass through the choke 30 over a given period of time will be considerably less than would be the case where the choke plug 30 forms the only fluid conduit from the piston chamber to the valve chamber, and it therefore follows that less dirt will be carried to the choke plug and as a result the accumulation of such dirt in the passage through the plug will naturally be less. From this it will be apparent that under ordinary service conditions the possibility of the passage in the choke plug 30 becoming clogged during the present maximum period of three years between inspections is very remote.

In equipments where the choke plug 30 provides the only fluid conduit between the emergency piston chamber 21 and the valve chamber 26 and quick action chamber 28 and there is no provision for cleaning the air as it passes from the chamber 21 to the choke plug, the passage through the choke plug may be so restricted by accumulated dirt as to retard the rate of increase in quick action chamber pressure in releasing the brakes.

When this occurs, the rate of recharge of the quick action chamber may be so slow that in effecting an emergency application of the brakes closely following a release of the heavy service application of the brakes, the quick action chamber may be insufficient to maintain the timing valve 81 seated long enough to provide the necessary slow increase in brake cylinder pressure required to insure the desired gentle gathering or closing of slack in the train. This will be readily understood when it is remembered that the flexible diaphragm 80 which controls the operation of the timing valve is responsive to variations in the opposing pressure of the quick action chamber and brake cylinder. Should the timing valve be prematurely unseated, the final inshot of fluid under pressure to the brake cylinder occurs too soon and thereby causes such a rapid build up in brake cylinder pressure that the slack in the train will gather or close harshly.

By the use of my invention, the flow of fluid from the emergency piston chamber 21 to the valve chamber 26 will be by way of both the choke plug 30 and the feed groove 31, so that the quick action chamber will be recharged sufficiently in releasing the brakes following a heavy service application to insure the proper operation of the timing valve when an emergency application of the brakes is effected closely following the release of the brakes.

It will be noted that when the emergency piston is moved to its inner release position in effecting a release of the brakes it cuts off communication between the emergency piston chamber and valve chamber by way of the feed groove 31. This insures against the possibility of overcharging the quick action chamber when the brake valve (not shown) is moved to release position and thereby eliminates the possibility of the emergency valve parts accidentally moving to emergency position when the brake valve is moved from release position to running position.

Another reason for cutting off communication through the feed groove 31 when the emergency piston is moved to its inner release position is to eliminate the possibility of increasing the quick action chamber pressure at a rate fast enough to cause the piston and thereby the emergency slide valve to move from inner release position to outer release position before the full back dump of fluid under pressure from the brake cylinder and auxiliary reservoir to the brake pipe has occurred.

It has hereinbefore been mentioned that in releasing the brakes following an emergency application the emergency valve parts are relieved of the resistance offered by the back dump insuring mechanism before the emergency piston uncovers the passage containing the choke plug 30 and feed groove 31. The reason for this is to prevent a premature increase in quick action chamber pressure which would either cause the piston to stop before it made its traverse to back dump position or make it sluggish in its movement. Further such a premature increase might be great enough to permit the emergency piston to be moved to its release position before the desired amount of fluid is back dumped from the brake cylinder to the brake pipe.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, in combination, a brake pipe, a quick action chamber adapted to be charged with fluid under pressure from the brake pipe, an emergency valve mechanism having two communications for charging said chamber, and means included in the emergency valve for controlling said communications, said means being movable to one position to render both of said communications effective to charge said chamber and movable to another position to render one of said communications ineffective to charge said chamber, said communications being so arranged with relation to each other that the flow of fluid through one is at all times independent of the flow of fluid through the other.

2. In a fluid pressure brake, in combination, a brake pipe, a quick action chamber adapted to be charged with fluid under pressure from the brake pipe, an emergency valve mechanism having two communications for charging said chamber, and means included in the emergency valve for controlling said communications, said means being movable to an outer release position to render both of said communications effective to charge said chamber and movable to an inner release position to render one of said communications ineffective to charge said chamber, said communications being so arranged with relation to each other that the flow of fluid through one is at all times independent of the flow of fluid through the other.

3. In a fluid pressure brake, in combination, a brake pipe, a quick action chamber adapted to be charged with fluid under pressure from the brake pipe, an emergency valve mechanism having a feed groove for charging said chamber and also having a choke plug for charging said chamber, and means included in the emergency valve device having an outer release position for cutting both the feed groove and the choke plug into charging relationship with said chamber and having an inner release position for cutting only the choke plug into charging relationship with said chamber, said communications being so arranged with relation to each other that the flow of fluid through one is at all times independent of the flow of fluid through the other.

4. In a fluid pressure brake equipment, in combination, a brake pipe, a quick action chamber adapted to be charged with fluid under pressure from the brake pipe, an emergency valve device having the usual choked charging communication for said chamber, and having an additional charging communication for assisting in charging said chamber, the flow of fluid from the brake pipe to said chamber and consequently the accumulation of dirt tending to clog the communications being divided between both communications, and means included in the emergency valve device operative according to the rate of increase in brake pipe pressure in releasing the brakes for cutting said additional charging communication into or out of charging relationship with said chamber, said communications being so arranged with relation to each other that the flow of fluid through one is at all times independent of the flow of fluid through the other.

5. In a fluid pressure brake equipment, in combination, a brake pipe, a quick action chamber adapted to be charge with fluid under pressure from the brake pipe, an emergency valve device having the usual choked charging communication for said chamber, and having an additional charging communication for assisting in charging said chamber, the flow of fluid from the brake pipe to said chamber and consequently the accumulation of dirt tending to clog the communications being divided between both communications, and means included in the emergency valve device operative upon an increase in brake pipe pressure at a certain rate to cut said additional charging communication out of charging relationship with said chamber and operative upon an increase in brake pipe pressure at a slower rate to cut said additional charging communication into charging relationship with said chamber, said communications being so arranged with relation to each other that the flow of fluid through one is at all times independent of the flow of fluid through the other.

6. In a fluid pressure brake equipment, in combination, a brake pipe, a quick action chamber adapted to be charged with fluid under pressure from the brake pipe, an emergency valve device having the usual choked charging communication for said chamber, and having an additional charging communication for assisting in charging said chamber, the flow of fluid from the brake pipe to said chamber and consequently the accumulation of dirt tending to clog the communications being divided between both communications, and means included in the emergency valve device operative upon an increase in brake pipe pressure at a certain rate to cut said additional charging communication out of charging relationship with said chamber and operative when the quick action chamber pressure becomes substantially equal to brake pipe pressure to cut said additional charging communication into charging relationship with said chamber, said communications being so arranged with relation to each other that the flow of fluid through one is at all times independent of the flow of fluid through the other.

7. In a fluid pressure brake, in combination, a brake pipe, a brake cylinder, a quick action chamber adapted to be charged with fluid under pressure from the brake pipe, two communications through which fluid under pressure is adapted to flow from the brake pipe to said chamber, an emergency valve device having a normal position in which fluid under pressure is supplied through both of said communications to said chamber and having an inner position in which fluid under pressure is supplied through only one of said communications and in which the brake cylinder is connected to the brake pipe and operated upon an emergency reduction in brake pipe pressure for first cutting off both of said communications and for then supplying fluid under pressure to the brake cylinder, said emergency valve device being movable to its inner position upon an increase in brake pipe pressure after an emergency reduction in brake pipe pressure.

8. In a fluid pressure brake, in combination, a brake pipe, a brake cylinder, a quick action chamber adapted to be charged with fluid under pressure from the brake pipe, two communications through which fluid under pressure is adapted to flow from the brake pipe to said chamber, an emergency valve device having a normal position in which fluid under pressure is supplied through both of said communications to said chamber and having an inner position in which fluid under pressure is supplied through only one of said communications and in which the brake cylinder is connected to the brake pipe and operated upon an emergency reduction in brake pipe pressure for first cutting off both of said communications and for then supplying fluid under pressure to the brake cylinder, said emergency valve device being movable to its inner position upon an increase in brake pipe pressure after an emergency reduction in brake pipe pressure, and means for urging said triple valve device from its inner position to its normal position when the pressure of fluid in said chamber is increased to substantially that of the brake pipe.

9. In a fluid pressure brake, a break pipe, a quick action chamber adapted to be charged with fluid under pressure from the brake pipe, two passages through which fluid under pressure is adapted to flow from the brake pipe to said chamber, an emergency valve device subject to the opposing pressures of the brake pipe and said chamber and operative upon a service reduction in brake pipe pressure to cut off communication from the brake pipe to both of said passages and operative upon a subsequent increase in brake pipe pressure in effecting the release of the brakes to either an outer release position in which the both of said passages are cut into charging communication with the brake pipe or an inner release position in which only one of said passages is cut into charging communication with the brake pipe, said communications being so arranged with relation to each other that the flow of fluid through one is at all times independent of the flow of fluid through the other.

10. In a fluid pressure brake, a brake pipe, a quick action chamber adapted to be charged with fluid under pressure from the brake pipe, two passages through which fluid under pressure is adapted to flow from the brake pipe to said chamber, a brake cylinder, an emergency valve device subject to the opposing pressures of the brake pipe and said chamber and operative upon an emergency reduction in brake pipe pressure for first cutting off communications between said passages and brake pipe and for then supplying fluid under pressure to the brake cylinder, said emergency valve device having an inner release position in which fluid under pressure released from the brake cylinder is adapted to flow to the brake pipe and in which only one of said passages is in charging communications with the brake pipe and having an outer release position in which fluid under pressure released from the brake cylinder is adapted to flow to the atmosphere and in which both of said passages are in charging communication with the brake pipe and operative upon an increase in brake pipe pressure to said inner release position, and means for insuring movement of the triple valve device through said outer release position to said inner release position.

11. In a fluid pressure brake, a brake pipe, a quick action chamber adapted to be charged with fluid under pressure from the brake pipe, two passages through which fluid under pressure is adapted to flow from the brake pipe to said chamber, a brake cylinder, an emergency valve device subject to the opposing pressures of the brake pipe and said chamber and operative upon an emergency reduction in brake pipe pressure for first cutting off communication between said passages and brake pipe and for then supplying fluid under pressure to the brake cylinder, said emergency valve device having an inner release position in which fluid under pressure released from the brake cylinder is adapted to flow to the brake pipe and in which only one of said passages is in charging communication with the brake pipe and having an outer release position in which fluid under pressure released from the brake cylinder is adapted to flow to the atmosphere and in which both of said passages are in charging communication with the brake pipe and operative upon an increase in brake pipe pressure to said inner release position, and means operative before said passages are cut into communication with the brake pipe for insuring movement of the triple valve device through said outer release position to said inner release position.

12. In a fluid pressure brake, a brake pipe, a quick action chamber adapted to be charged with fluid under pressure from the brake pipe, two passages through which fluid under pressure is adapted to flow from the brake pipe to said chamber, a brake cylinder, an emergency valve device subject to the opposing pressures of the brake pipe and said chamber and operative upon an emergency reduction in brake pipe pressure for first cutting off communication between said passages and brake pipe and for then supplying fluid under pressure to the brake cylinder, said emergency valve device having an inner release position in which fluid under pressure released from the brake cylinder is adapted to flow to the brake pipe and in which only one of said passages is in charging communication with the brake pipe and having an outer release position in which fluid under pressure released from the brake cylinder is adapted to flow to the atmosphere and in which both of said passages are in charging communication with the brake pipe and operative upon an increase in brake pipe pressure to said inner release position, and means operative to prevent the triple valve device from moving to either release position until a predetermined brake cylinder pressure has been obtained and operative when said predetermined pressure has been obtained to permit the triple valve device to move to a release position, the operation of said means insuring the movement of the triple valve device through the outer release position to the inner release position.

ELLERY R. FITCH.